(No Model.)
H. J. NEY.
VEHICLE WHEEL.
No. 574,752. Patented Jan. 5, 1897.
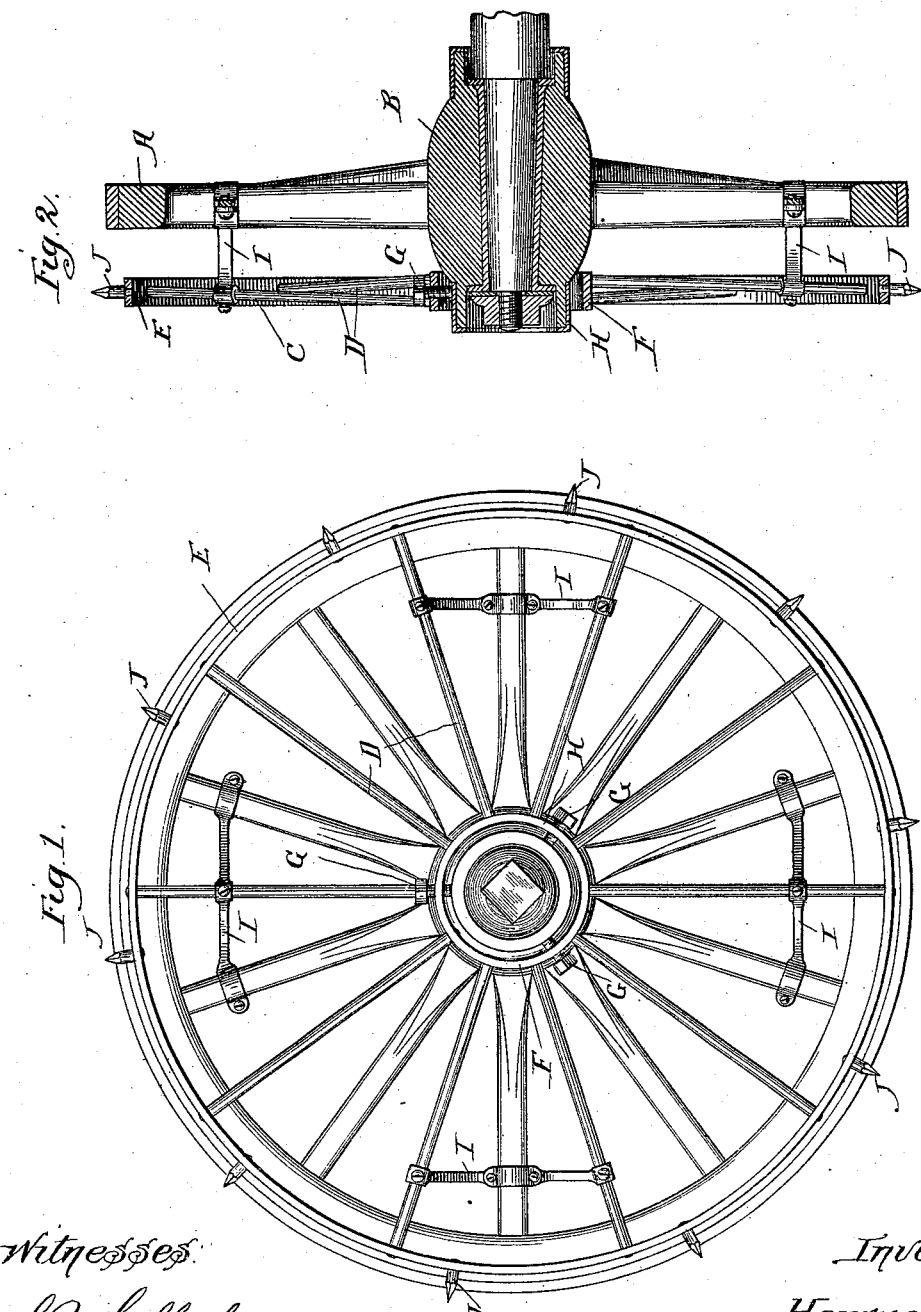
Witnesses:
H. B. Hallock.
S. S. Williamson
Inventor:
Henry J. Ney
by Geo. H. Holgate
Attorney.

UNITED STATES PATENT OFFICE.

HENRY J. NEY, OF POTTSVILLE, PENNSYLVANIA.

VEHICLE-WHEEL.

SPECIFICATION forming part of Letters Patent No. 574,752, dated January 5, 1897.

Application filed March 25, 1896. Serial No. 584,738. (No model.)

*To all whom it may concern:*

Be it known that I, HENRY J. NEY, a citizen of the United States, residing at Pottsville, in the county of Schuylkill and State of Pennsylvania, have invented certain new and useful Improvements in Vehicle-Wheels, of which the following is a specification.

My invention relates to a new and useful improvement in secondary wheels for vehicles, and has for its object to provide such a wheel that may be readily attached to the ordinary wheels of a vehicle, and when so attached take such a hold upon the road-bed, and especially when the latter is covered with snow or ice, as to prevent the primary wheels of the vehicle from slipping and at the same time not interfere with the function of said primary wheels when the latter are traveling over a road-bed in the ordinary condition.

With these ends in view my invention consists in the details of construction and combination of elements hereinafter set forth and then specifically designated by the claims.

In order that those skilled in the art to which this invention appertains may understand how to make and use the same, I will describe its construction and operation in detail, referring by letters to the accompanying drawings, forming a part of this specification, and in which—

Figure 1 is a side elevation of a wheel having my improvement attached thereto, and Fig. 2 a vertical diametrical section thereof.

Great annoyance and inconvenience is sometimes occasioned by the slipping of the wheels of a vehicle in traveling over a slippery road-bed, and especially when passing down steep grades with heavy loads, as under these conditions, even though the wheels of the vehicle be so braked as to prevent their revolving, yet they will slide, thereby endangering the life and limb of both the team and driver, as well as the destruction of the vehicle and load. This difficulty I have entirely overcome without altering the construction of the wheels of the vehicles now in use, and I accomplish this in the following manner:

Referring to the drawings, A represents a wheel of ordinary construction, and B the hub thereof. C is the secondary wheel composed of the spokes D and rim E, both of which may be made of any suitable material, but in practice I prefer to construct this secondary wheel entirely of metal. The spokes D converge toward the center of the secondary wheel and are secured to a central ring F, through which pass the bolts G, preferably three in number and placed one hundred and twenty degrees apart, by means of which the ring F may be securely clamped to the ferrule H of the hub B, and in order to further secure the secondary wheel to the primary wheel I provide clamps I, the ends of which are secured to the spokes D and their centers adapted to be clamped to the spokes of the primary wheels, as clearly shown. This arrangement serves to prevent undue strain coming upon the hub of the primary wheel and securely holds the secondary wheel in its proper relative position thereto. Projecting radially from the rim E of the secondary wheel are a number of spikes or bobs J, which are sharpened at their outer ends and project slightly past the periphery of the primary wheel in order that they may take a hold upon the road-bed over which said primary wheel passes, so that it will be seen that when a vehicle is fitted with my improvement the wheels thereof cannot slip, as the spikes will be driven into the road-bed or the ice thereon by the weight of said vehicle. Thus when the wheels are retarded by proper brake mechanism the movement of the vehicle will be likewise retarded, and it will also be seen that as the secondary wheels are arranged to one side of the primary wheels no interference is had with the usual brake-shoes.

One of the advantages of my improvement is that it may be attached to and detached from a wheel without altering the latter and with but little labor, so that when upon short notice it becomes necessary to increase the traction of the wheels of a vehicle the secondary wheels may be clamped to the primary wheels, and when the necessity for their use has passed they may readily detached.

It is usually not necessary to apply my improvement to other than the brake or rear wheels of a vehicle, although, if desired, they may be attached to the front wheels as well, in which case the latter would be caused to more positively track and prevented from shearing, thereby giving better guidance to the vehicle.

While my improvement is especially designed for use in connection with vehicles to be drawn by horses and the like, it is equally applicable to vehicles that are to be driven by a motor-power carried by said vehicles, in which case it would serve the twofold purpose of increasing the traction-power for propelling the vehicle, as well as the hold of the wheels upon the road-bed when a brake was applied.

Having thus fully described my invention, what I claim as new and useful is—

1. In a device of the character described, an auxiliary wheel having projections on its periphery and means for securing it to an ordinary wheel consisting of a T-shaped clamp adapted to engage the spokes of the ordinary and auxiliary wheel, as and for the purpose described.

2. In a device of the character described, an auxiliary wheel consisting of an inner ring, an outer ring, spokes connecting said rings, projections formed on the periphery of the outer ring, set-screws threaded in the inner ring and clamps adapted to connect the spokes of the auxiliary wheel to the spokes of an ordinary wheel, as and for the purpose described.

In testimony whereof I have hereunto affixed my signature in the presence of two subscribing witnesses.

HENRY J. NEY.

Witnesses:
S. S. WILLIAMSON,
R. M. PIERCE.